United States Patent [19]
Findlater et al.

[11] Patent Number: 5,953,345
[45] Date of Patent: Sep. 14, 1999

[54] REDUCED PIN-COUNT 10BASE-T MAC TO TRANSCEIVER INTERFACE

[75] Inventors: Stewart Findlater, Mountain View; James R. Rivers, Saratoga; David H. Yen, Palo Alto; Brian Petersen, San Jose, all of Calif.; Bernard N. Daines, Spokane, Wash.; David Talaski, Los Altos, Calif.

[73] Assignee: Cisco Technology, Inc., San Jose, Calif.

[21] Appl. No.: 09/089,033

[22] Filed: Jun. 2, 1998

[51] Int. Cl.[6] .................................. H04J 3/17; H04J 3/16; H04J 3/06

[52] U.S. Cl. .......................... 370/446; 370/469; 370/503

[58] Field of Search .................................... 370/419, 420, 370/421, 466, 425, 465, 445, 446, 438, 439, 407, 469, 503, 434

[56] References Cited

U.S. PATENT DOCUMENTS

| | | | |
|---|---|---|---|
| 5,099,473 | 3/1992 | Gupta et al. | 370/434 |
| 5,568,470 | 10/1996 | Ben-Nun et al. | 370/469 |
| 5,636,140 | 6/1997 | Lee et al. | 370/469 |
| 5,715,287 | 2/1998 | Wadhawan et al. | 370/466 |
| 5,835,728 | 11/1998 | Shinomiya et al. | 370/469 |
| 5,856,979 | 1/1999 | Vogel et al. | 370/503 |

OTHER PUBLICATIONS

"Internal Cisco documentation re: sold Ethernet switch", Jan. and Jul. 1996.

"Daines correspondence", Aug. 1998.

Advanced Micro Devices, "Quad Ethernet Switching Transceiver (QuEST™)", Am79C989, Publication No. 21173, Apr. 1997.

Texas Instruments, "Eight 10Base–T Physical–Layer Interfaces", TNETE2008, Dec. 1997, Revised Feb. 1998.

*Primary Examiner*—Chau Nguyen
*Assistant Examiner*—Phuongchau Ba Nguyen
*Attorney, Agent, or Firm*—Beyer & Weaver, LLP

[57] ABSTRACT

Provided is a 10Base-T MAC to PHY interface requiring only two wires (pins) per port, with two additional global wires: a clock wire (pin), and a synchronization wire (pin). This reduction in the number of pins associated with each port is achieved by time-division multiplexing wherein each time-division multiplexed wire combines a plurality of definitions from the conventional seven-wire interface. As a result, each port has its own pair of associated time-division multiplexed wires (pins) and the addition of each port simply requires two additional wires. According to a preferred embodiment of the present invention, information normally transferred on nine wires in a conventional seven-wire interface at 10 MHz is time-division multiplexed onto two wires (corresponding to two pins) that transfer data at 40 MHz, four times the speed of conventional interfaces. Importantly, this multiplexing is done on a port by port basis. Therefore, the number of pins required for a MAC to transceiver interface is two times the number of ports plus two instead of nine times the number of ports, and the addition of each additional port requires only two more wires (pins).

24 Claims, 4 Drawing Sheets

REDUCED PIN-COUNT 10BASE-T MAC TO TRANSCEIVER INTERFACE

CROSS-REFERENCE TO RELATED APPLICATIONS

This application is related to co-pending U.S. patent applications Ser. Nos. 09/089,312 and 09/088,956 (Attorney Docket Nos.CISCP035/384 and CISCP053/546, respectively) filed concurrently herewith, which are incorporated herein by reference for all purposes.

BACKGROUND OF THE INVENTION

The present invention relates generally to network computing. More specifically, the present invention relates to methods and apparatuses for connecting a system chip to a 10Base-T transceiver, and in particular, to a reduced pin-count 10Base-T MAC to transceiver interface.

In computer network systems there is typically a natural division between chips handling the physical layer, which is responsible for transmitting data on the network, and the system chips, which perform logical operations with data transmitted on the network. Ethernet hubs, routers and switches are composed of multiple ports, and may be generically referred to as multi-port Ethernet devices. Each port is composed of a system chip, which includes a media access controller ("MAC") layer, and a physical ("PHY") layer. Modern multi-port Ethernet devices typically integrate multiple MACs into one system chip (MAC chip) as well as multiple PHYs into another chip (PHY chip).

FIG. 1 shows in simplified block form a multi-port 10 Base-T Ethernet device 100 with a system chip 102 connected to a network Ethernet cable 104 through a PHY chip 106, also referred to as a transceiver. The system chip 102 includes four MACs 108 which are designed to interface with PHYs on the PHY chip 106 to connect the system chip 102 to the network 104. The de facto industry standard for connecting a system chip's MACs, to a 10Base-T Ethernet transceiver's PHYs, is a "seven-wire interface" 110.

In such a "seven-wire interface," each wire is dedicated to transmitting a particular type of data signal. In actual fact, a "seven-wire interface" may include more than seven wires connecting MAC and PHY chips. For example, in one common implementation, the "seven-wire interface" comprises nine wires. The seven principal wires carry signals for the following functions: transmit clock, transmit enable, transmit data, receive data valid, receive data, collision, and receive clock. In addition, in the nine-wire implementation, there are wires dedicated to carrying a jabber signal, and a linktestpass signal.

The transmit clock signal is provided to clock the data sent from the MAC to the PHY. The transmit enable signal is high or low depending on whether data is being sent from the MAC to the PHY. The transmit data signal provides the actual data sent from the MAC to the PHY.

The receive clock signal is provided to clock the data sent from the PHY to the MAC. The receive data valid signal (also referred to as a receive enable signal) is high or low depending on whether receive data is being sent from the PHY to the MAC. The receive data signal provides the actual data sent from the PHY to the MAC. The collision signal is sent from the PHY to the MAC, and is high or low depending on whether a collision has taken place on the network (i.e., more than one station is transmitting at the same time).

The jabber signal is intended to address the "jabber" error which occurs in some network systems, particularly early ones, when a node on the network becomes stuck on transmit, with the result that no other node can get on the network. The purpose of the jabber signal is shut down the physical layer interface (PHY), effectively resetting the network, and allowing other nodes to access the network. The linktestpass signal indicates that a unit is on the network; that is, a PHY's signal to a MAC that it is connected to the network.

Each wire in a conventional MAC to PHY interface has associated with it a pin on each of the MAC and the PHY chips. Therefore, in the conventional nine-wire implementation of a seven-wire interface, each port on multi-port 10Base-t Ethernet device has nine pins on each of the MAC and PHY chips with which it is associated. In order to reduce manufacturing costs, it would be useful to reduce the number of pins associated with each port on a multi-port 10 Base-T Ethernet device as much as possible.

Other attempts to address this problem have adapted the conventional seven-wire interface of a multi-port 10 Base-T Ethernet device using time-division multiplexing (TDM). TDM involves the transmission of several signals over a given wire at discrete time intervals. This approach works by synchronizing the transmission and sampling of the signals on the wire. In a conventional MAC to PHY interface, signals are transmitted at a frequency of about 10 MHz. By increasing the frequency of transmission by for example, four times, four times the information may be transmitted over the wires of a conventional seven-wire interface at 40 MHz than was possible at 10 MHz in the same period of time.

This TDM approach may reduce the number of pins 202 associated with a given port on a multi-port 10 Base-T Ethernet device by ganging the signals required for proper functioning of a plurality of ports onto the nine wires of a conventional seven-wire interface. Using the example noted previously of increasing the transmission frequency four times to 40 MHz, this TDM system may be optimized by ganging signals from multiples of four ports. For example, the 36 signals required for four ports may be ganged onto the nine wires of a conventional seven-wire interface, each wire carrying four signals at 40 MHz in the same amount of time that required 36 wires in the conventional 10 MHz seven-wire interface.

However, while this approach may reduce the number of pins associated with each port on a multi-port 10 Base-T Ethernet device, it has the disadvantage that each wire in the seven-wire interface retains its previous definition; that is, according to this approach, a dedicated transmit data wire may now carry transmit data information for four ports, but will not carry any other type of information (e.g., transmit enable). Therefore, if the signal on any wire is lost all four ports are affected. Moreover, the addition of any further ports requires a complete additional seven-wire interface.

Accordingly, improved MAC to PHY interfaces which allow for a reduction of the number of pins associated with each port on a multi-port 10 Base-T Ethernet device, and increased flexibility, efficiency and reliability, would be desirable.

SUMMARY OF THE INVENTION

The present invention addresses this problem by providing a 10Base-T MAC to PHY interface requiring only two wires (pins) per port, with two additional global wires: a clock wire (pin), and a synchronization wire (pin). This reduction in the number of pins associated with each port is achieved by time-division multiplexing wherein each time-division multiplexed wire combines a plurality of definitions from the conventional seven-wire interface. As a result, each port has its own pair of associated time-division multiplexed wires (pins) and the addition of each port simply requires two additional wires. According to a preferred embodiment of the present invention, information normally transferred on nine wires in a conventional seven-wire interface at 10 MHz is time-division multiplexed onto two wires (corresponding to two pins) that transfer data at 40 MHz, four times the speed of conventional interfaces. Importantly, this multiplexing is done on a port by port basis. Therefore, the number of pins required for a MAC to transceiver interface is two times the number of ports plus two instead of nine times the number of ports, and the addition of each additional port requires only two more wires (pins).

In one aspect, the present invention provides a multi-port 10Base-T Ethernet device. The device includes a MAC chip, a PHY chip, and an interface connecting the MAC and PHY chips. The interface includes two time-division multiplexed wires per port, each time-division multiplexed wire conveying time-division multiplexed signals having different definitions, and two global wires conveying clock and synchronization pulse signals for up to all of the ports.

In another aspect, the present invention provides a 10Base-T MAC to PHY interface. The interface includes two time-division multiplexed wires for each port serviced by the interface, each time-division multiplexed wire conveying time-division multiplexed signals having different definitions, and two global wires conveying clock and synchronization pulse signals for one or more ports.

In a further aspect, the present invention provides a method of interfacing a MAC to a PHY in a 10Base-T Ethernet device. The method involves conveying a first plurality of time-division multiplexed signals having different definitions from a MAC to a PHY over a transmit wire, and a second plurality of time-division multiplexed signals having different definitions from the PHY to the MAC over a receive wire. In addition, the method involves conveying a clock signal to the MAC and PHY over a global clock wire, and a synchronization pulse signal to the MAC and PHY over a global synchronization pulse wire.

It should be appreciated that the present invention can be implemented in numerous ways, including as a device, a process, or a system. Some inventive embodiments of the present invention are described below.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention a s defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention addresses this problem by providing a 10Base-T MAC to PHY interface requiring only two wires (pins) per port, with two additional global wires: a clock wire (pin), and a synchronization wire (pin). This reduction in the number of pins associated with each port is achieved by time-division multiplexing wherein each time-division multiplexed wire combines a plurality of definitions from the conventional seven-wire interface. As a result, each port has its own pair of associated time-division multiplexed wires (pins) and the addition of each port simply requires two additional wires. According to a preferred embodiment of the present invention, information normally transferred on nine wires in a conventional seven-wire interface at 10 MHz is time-division multiplexed onto two wires (corresponding to two pins) that transfer data at 40 MHz, four times the speed of conventional interfaces. Importantly, this multiplexing is done on a port by port basis. Therefore, the number of pins required for a MAC to transceiver interface is two times the number of ports plus two instead of nine times the number of ports, and the addition of each additional port requires only two more wires (pins).

Figure 1:
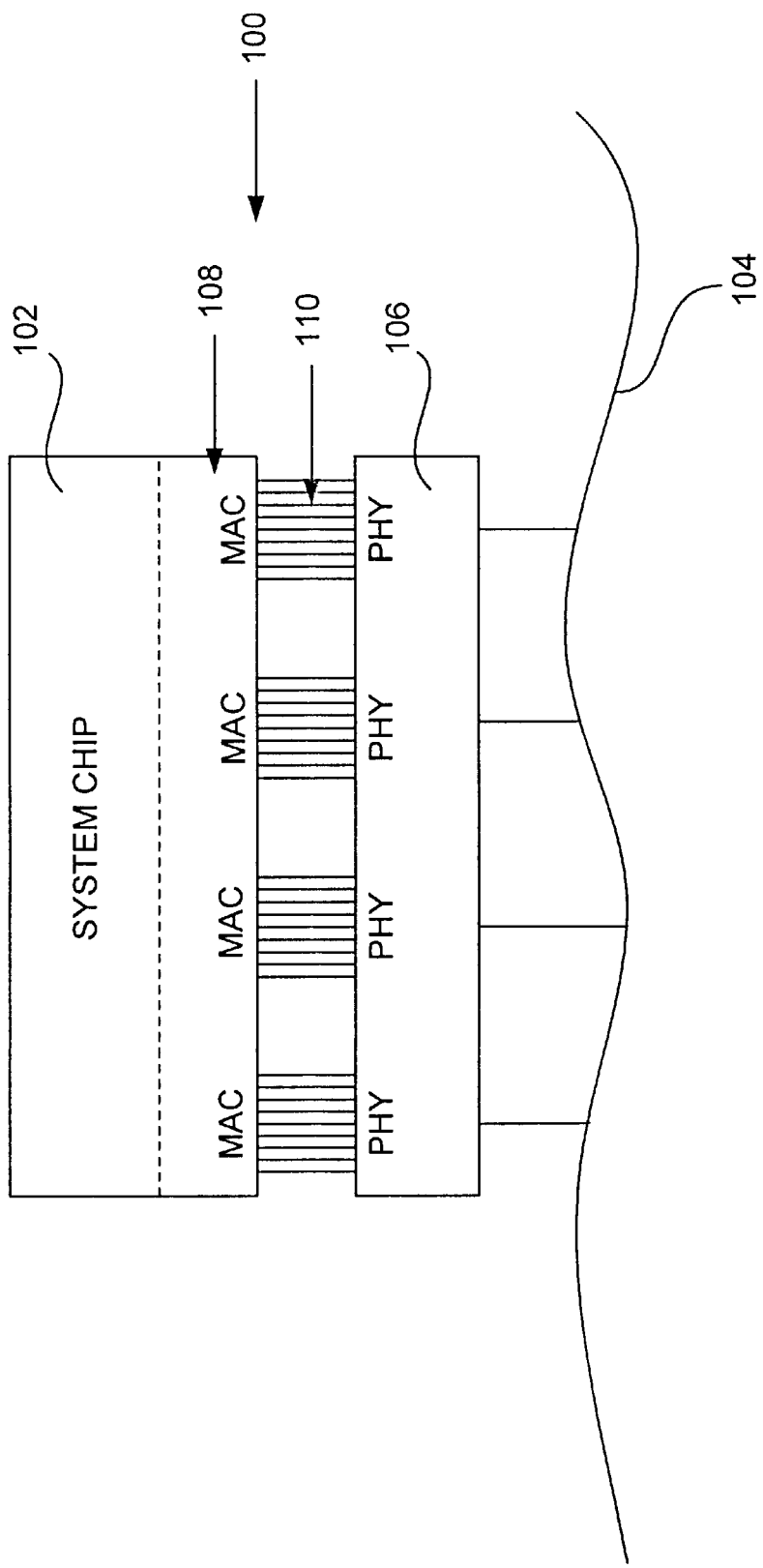
FIG. 1 depicts simplified block diagram of a multi-port 10 Base-T Ethernet device with a conventional MAC to PHY seven-wire interface.
Figure 2:
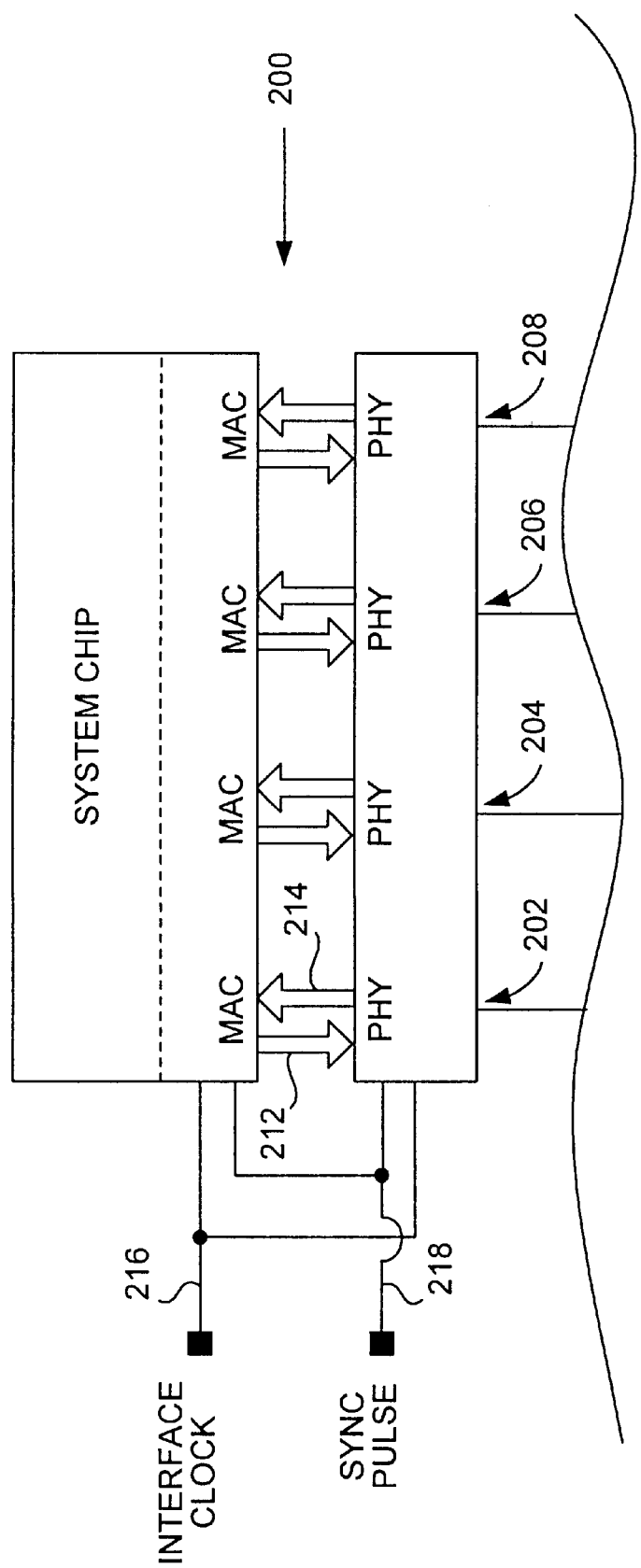
FIG. 2 depicts a block diagram of a multi-port 10 Base-T Ethernet device with MAC to PHY interfaces which use time-division multiplexing of the signals required by the ports on a multi-port 10 Base-T Ethernet device in accordance with one preferred embodiment of the present invention, wherein each time-division multiplexed wire conveys signals having a plurality of definitions from the conventional seven-wire interface.

An example illustrating a interface in accordance with a preferred embodiment of the present invention is illustrated in a block diagram in FIG. 2. The figure shows a multi-port 10Base-T Ethernet device 200, for example, a switch, router or hub, with four ports 202, 204, 206 and 208, each composed of a MAC and a PHY. According to a preferred embodiment of the present invention, the transmit enable and transmit data signals are multiplexed on one wire for each port, for example transmit wire 212 for port 202, while the receive data valid, receive data, collision, jabber, and linktestpass signals are multiplexed on a second wire for each port, for example receive wire 214 for port 202. Of the remaining signals, the transmit clock signal is replaced by a global interface clock signal which has its own dedicated wire 216 that is not tied to any particular port, but provides a global synchronized clock signal for from a plurality of ports to all the ports on the multi-port 10Base-T Ethernet device. The receive clock signal is handled in such a way that it does not require transmission across a wire, as described further below. As noted previously, an additional signal is used in this invention, that being a synchronization pulse signal, which like the global interface clock signal, has its own dedicated global synchronization pulse pin (wire) 218 tied to a plurality of ports up to all of the ports on a multi-port 10Base-T Ethernet device.

Figure 3:
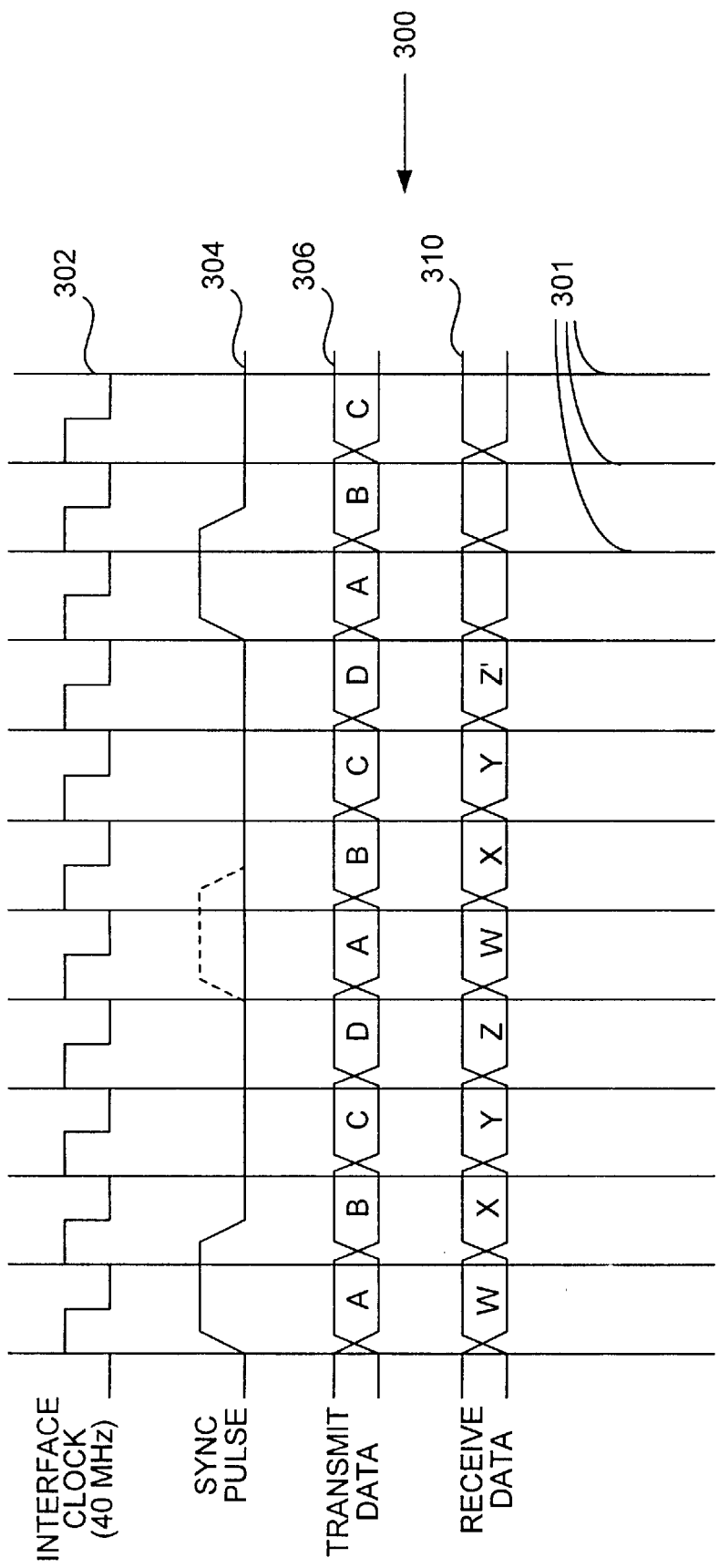
FIG. 3 depicts a timing diagram illustrating the synchronicity between the interface clock and the various transmit, receive and synchronization signals, for a 10Base-T MAC to PHY interface in accordance with a preferred embodiment of the present invention.

FIG. 3 depicts a timing diagram illustrating the synchronicity between the interface clock and the various transmit, receive and synchronization signals, for a 10Base-T MAC to PHY interface in accordance with a preferred embodiment of the present invention. The top-most line 302 represents a 40 MHz MAC clock. As noted above, the MAC clock signal conveyed on a global wire to a plurality of ports up to all of the ports on a multi-port 10Base-T Ethernet device. The data on the wires of the MAC to PHY interface is read and/or driven on the up stroke of each cycle of the clock signal, as indicated by the vertical lines 301 of the timing diagram 300.

The second line 304 on FIG. 3 represents the synchronization pulse signal, which is high for every eight cycles of the MAC clock 302. The synchronization pulse signal is an additional signal not found among the signals conveyed by a conventional seven-wire interface. The purpose of the synchronization pulse in the time-division multiplexed system of the present invention is to signal the end of each cycle of signals, that is, the synchronization pulse is high between transmission and receipt of a full set of signals, as described further below. The synchronization pulse signal 304 is also conveyed on a global wire to a plurality of ports up to all of the ports on a multi-port 10Base-T Ethernet device.

The third line 306 on FIG. 3 represents the transmit signal. Since the global interface clock speed is four times that of the transmit clock of a conventional device, four times the amount of data may be transmitted in the same given amount of time. The transmit line 306 is divided into "time slots" 308 which represent that amount of data that would be transmittable in a single cycle of the conventional 10 MHz clock. The transmit data and transmit enable signals are TDM multiplexed on a single transmit wire per port in accordance with this preferred embodiment of the present invention. Since there are four slots available per conventional 10 MHz clock cycle, there is excess capacity in the transmit line 303. Therefore, only half of the time slots available to transmit signals on the transmit wire, for example, slots B and C, are used in this embodiment of the invention.

The second (receive) wire associated with each port, however, must somehow accommodate the data received over five wires in the conventional seven-wire interface in only four time slots per cycle. This is accomplished by TDM multiplexing the five signals on the receive wire, with the receive data valid, receive data, and collision signals represented in each consecutive set of four time slots, illustrated as slots W, X and Y, respectively, and the jabber and linktestpass signals represented alternately in the fourth time slot of consecutive sets of four time slots illustrated as slots Z and Z', respectively. This configuration is illustrated by the fourth line 310 in FIG. 3, which represents data on the receive wire.

As a result, rather than a unique set of four time slots on the receive wire, there is a unique set of eight time slots. This is achieved by having the synchronization signal transmit every eight time slots rather than every four time slots as shown in line 2 of the FIG. 3 timing diagram (the broken line represents where a four time slot signal would fall). The receipt of the jabber and linktestpass signals every second clock cycle is acceptable since these signals rarely change during the transmission of a packet on the network.

The remaining wire of a conventional seven-wire interface is dedicated to the receive clock signal. The receive clock signal is handled in accordance with a preferred embodiment of the present invention in a manner that does not require any additional wire between the MAC and PHY chips. In some conventional devices, a receive clock is incorporated in each MAC chip, and a PHY passes both the data and a clock signal from each port. Each receive clock operates at an independent frequency. In order to support the individual receive clocks in each conventional MAC chip, there is a dedicated receive clock wire in the seven-wire interface between each MAC an d PHY. Also, conventional MAC chips may include an elasticity buffer which is large enough and operates such that it may receive incoming data from the network (via the PHY) and then transmit it using its receive clock signal in such a manner that it does not empty or reach capacity during the transmission of a packet of data on the network.

In accordance with the present invention, the receive clock wire between each MAC and PHY is eliminated by providing an elasticity buffer (FIFO) in the PHY instead of in the MAC. In this configuration, the PHY is able to receive the data using a clock recovered from the data, and then pass the data to the MAC using the global clock. In order to send receive data to the MAC synchronous to the global clock, the PHY passes the data through an elasticity FIFO to handle any difference between the global clock rate and the clock rate at the packet source (10 MHz). The elasticity FIFO on a PHY in accordance with the present invention should has sufficient capacity, and is preferably operated so that it does not reach capacity nor empty during the transmission of a packet. As such, the PHY may receive data using recovered clocks, allowing the buffer to become approximately half full, and then pass data to the MAC using the global clock, which will usually have a different phase and frequency. In this way the buffer never overflows or becomes empty over the course of receiving and transmitting a packet of data, and no receive clock wire is necessary in the MAC to PHY interface.

The Ethernet specification (IEEE 802.3) calls for packet data to be referenced to a clock with a frequency tolerance of 100 ppm (0.01%). However, it is not uncommon to encounter Ethernet stations with clocks that have frequency errors up to 0.1%. Accordingly, in a preferred embodiment, the size of an elasticity FIFO with sufficient capacity so that the buffer never overflows or becomes empty over the course of receiving and transmitting a packet of data may be calculated as follows:

FIFO size=2*(maximum frame in bits)*(end station error+local error).

Figure 4:
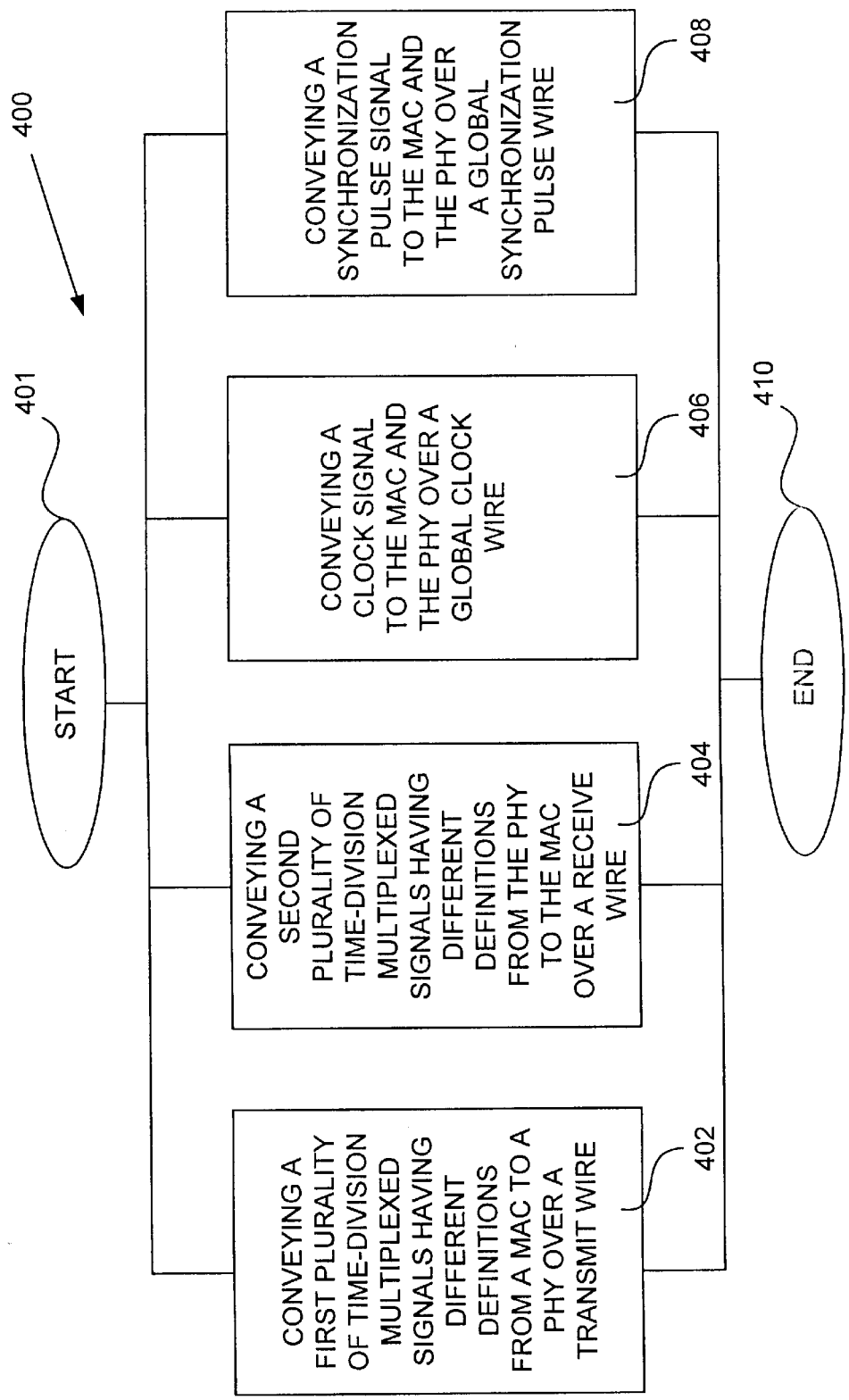
FIG. 4 depicts a flow diagram of a method of interfacing a 10Base -T MAC to a PHY in accordance with a preferred embodiment of the present invention.

FIG. 4 depicts a flow diagram of a method of interfacing a 10Base-T MAC to a PHY in accordance with a preferred embodiment of the present invention. It should be understood that this process flow is intended to illustrate the way in which signals are conveyed between MACs and PHYs in accordance with a preferred embodiment of the present invention, and not to indicate a sequence of events. The various steps of the process 400 may be occurring concurrently. The process 400 begins at 401, and at a step 402 time-division multiplexed transmit signals of different definitions are conveyed from a MAC to a PHY over a transmit wire. At a step 404, time-division multiplexed receive signals of different definitions are conveyed from the PHY to the MAC over a receive wire.

In addition, the MAC to PHY interface process 400 involves conveying clock and synchronization signals on each of two global wires, as described previously with reference to FIGS. 2 and 3. At a step 406 of process 400, a 40 MHz clock signal is conveyed to the MAC and the PHY over a global clock wire. At a step 408, a synchronization pulse signal is conveyed to the MAC and the PHY over a global synchronization pulse wire. Thus, the 10Base-T MAC to PHY interfacing may be accomplished in accordance with the present invention using only 2*(number of ports) +2 wires. The interfacing process ends at 410.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A multi-port 10Base-T Ethernet device, comprising:
   a MAC chip;
   a PHY chip; and
   an interface connecting said MAC and PHY chips, said interface comprising,
      two time-division multiplexed wires per port, each time-division multiplexed wire conveying time-division multiplexed signals having different definitions, and
      two global wires conveying clock and synchronization pulse signals for up to all of said plurality of ports.

2. The multi-port 10Base-T Ethernet device of claim 1, wherein said two time-division multiplexed wires comprise a transmit wire and a receive wire.

3. The multi-port 10Base-T Ethernet device of claim 2, wherein said transmit wire conveys transmit enable and transmit data signals from said MAC chip to said PHY chip.

4. The multi-port 10Base-T Ethernet device of claim 2, wherein said receive wire conveys receive data valid, receive data, collision, jabber, and linktestpass signals from said PHY chip to said MAC chip.

5. The multi-port 10Base-T Ethernet device of claim 1, wherein said clock signal has a frequency of about 40 MHz.

6. The multi-port 10Base-T Ethernet device of claim 1, wherein said time-division multiplexed signals are conveyed on said time-division multiplexed wires in 10 MHz time slots.

7. The multi-port 10Base-T Ethernet device of claim 1, wherein said synchronization pulse is high every eight time slots.

8. The multi-port 10Base-T Ethernet device of claim 1, wherein said PHY chip comprises an elasticity FIFO.

9. The multi-port 10Base-T Ethernet device of claim 8, wherein the capacity of said elasticity FIFO is calculated as follows:

FIFO size=2*(maximum frame in bits)*(end station error+local error).

10. A 10Base-T MAC to PHY interface, comprising:
    two time-division multiplexed wires connecting a MAC chip with a PHY chip for each port serviced by the interface, each time-division multiplexed wire conveying time-division multiplexed signals having different definitions, and
    two global wires conveying clock and synchronization pulse signals for one or more the ports.

11. The MAC to PHY interface of claim 10, wherein said two time-division multiplexed wires comprise a transmit wire and a receive wire.

12. The MAC to PHY interface of claim 11, wherein said transmit wire conveys transmit enable and transmit data signals from said MAC chip to said PHY chip.

13. The MAC to PHY interface of claim 11, wherein said receive wire conveys receive data valid, receive data, collision, jabber, and linktestpass signals from said PHY chip to said MAC chip.

14. The MAC to PHY interface of claim 10, wherein said clock signal has a frequency of about 40 MHz.

15. The MAC to PHY interface of claim 10, wherein said time-division multiplexed signals are conveyed on said time-division multiplexed wires in 10 MHz time slots.

16. The MAC to PHY interface of claim 10, wherein said synchronization pulse is high every eight time slots.

17. A method of interfacing a MAC to a PHY in a 10Base-T Ethernet device, comprising:
    conveying a first plurality of time-division multiplexed signals having different definitions from a MAC chip to a PHY chip over a transmit wire;
    conveying a second plurality of time-division multiplexed signals having different definitions from the PHY chip to the MAC chip over a receive wire;
    conveying a clock signal to said MAC chip and said PHY chip over a global clock wire; and
    conveying a synchronization pulse signal to said MAC chip and said PHY chip over a global synchronization pulse wire.

18. The method of claim 17, wherein said transmit wire conveys transmit enable and transmit data signals from said MAC chip to said PHY chip.

19. The method of claim 17, wherein said receive wire conveys receive data valid, receive data, collision, jabber, and linktestpass signals from said PHY chip to said MAC chip.

20. The method of claim 17, wherein said clock signal has a frequency of about 40 MHz.

21. The method of claim 17, wherein said time-division multiplexed signals are conveyed on said time-division multiplexed wires in 10 MHz time slots.

22. The method of claim 17, wherein said synchronization pulse is high every eight time slots.

23. The method of claim 17, wherein said PHY chip comprises an elasticity FIFO.

24. The method of claim 23, wherein the capacity of said elasticity FIFO is calculated as follows:

FIFO size=2*(maximum frame in bits)*(end station error+local error).

* * * * *